Oct. 29, 1968  P. URBAN ET AL  3,408,287
OXIDATION OF MERCAPTANS
Filed April 20, 1966
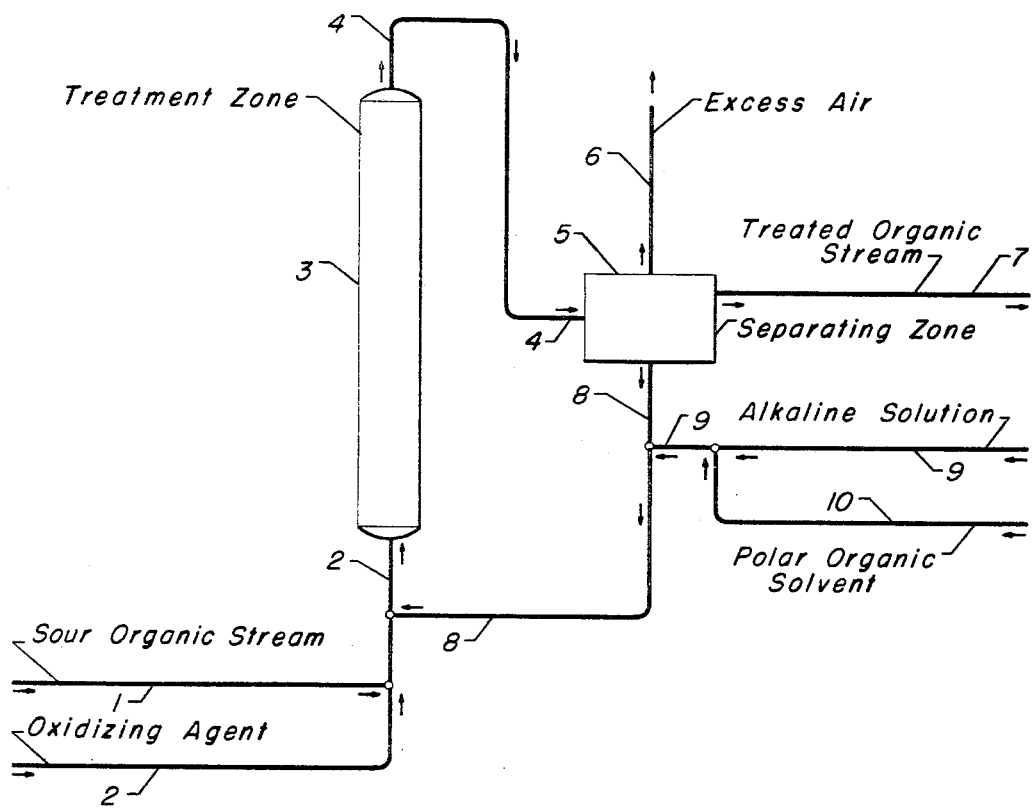
INVENTOR:
Peter Urban
Henry A. Cyba
BY:
*James R. Hoatson Jr.*
*Robert W. Erickson*
ATTORNEYS

United States Patent Office 3,408,287
Patented Oct. 29, 1968

3,408,287
OXIDATION OF MERCAPTANS
Peter Urban, Northbrook, and Henry A. Cyba, Evanston, Ill., assignors to Universal Oil Products Company, Des Plaines, Ill., a corporation of Delaware
Filed Apr. 20, 1966, Ser. No. 543,871
9 Claims. (Cl. 208—207)

ABSTRACT OF THE DISCLOSURE

Sweetening of sour hydrocarbon fractions containing high molecular weight mercaptans by contact with oxygen and phthalocyanine catalyst in the presence of an alkali metal hydroxide solution containing a polar organic solvent selected from the group consisting of dialkyl sulfoxide, amino-alcohols, amino-hydroxy-alkyl ethers, alkylamines, alkylpolyamines, alkylamides, and mixtures thereof.

---

The present invention relates to the treating of a sour organic stream in order to oxidize mercaptans contained therein. More precisely, the present invention encompasses a process for the treatment of a sour organic stream containing a mercaptan component in order to effectively and efficiently oxidize mercaptans to disulfides, using for this purpose a specifically designed reactive environment which consists of a combination of a phthalocyanine catalyst and an alkaline solution of a special type of polar organic solvent. The conception of this reactive environment was facilitated by the recognition that the observed difficulty of the oxidation of high molecular weight mercaptans was, as will be hereinafter explained in detail, a result of a combination of factors such as: the inability of the caustic soluble or wetted catalyst to contact the oil dissolved mercaptans, the presence of surface active materials on the surface of the catalyst and at the caustic-oil phase interface which constituted a barrier to the approach of the reactants, and the gradual formation of a tar-like deposition on the surface of the catalyst. This recognition, in turn prompted the investigation of catalytic environments that would tend to minimize the detrimental effects of the above factors; and this investigation led to a class of polar organic solvents—hereinafter enumerated—whose presence in the reactive environment had the remarkable property of minimizing these detrimental effects. Therefore, in essence, the present invention involves the utilization of phthalocyanine catalyst in conjunction with a specially selected polar organic solvent in a mercaptan oxidation process in order to accelerate the catalytic oxidation of higher molecular weight mercaptans and to retard the deactivation of the phthalocyanine catalytic composite.

Traditionally, in the petroleum and chemical industries, the removal of mercaptans from various process streams and materials has been a substantial problem. The reasons for desiring this removal are so well-known in the art, that it would be needless repetition to consider them in detail here. Nevertheless, some of the ramifications of their presence are: corrosion problems, burning problems, catalytic poisoning problems, undesired side reaction problems, offensive odor problems, etc.

The methods that have been proposed for the solution of this removal problem can be catagorized into those that seek absolute removal of the mercaptan compounds or any derivative of the mercaptan compounds from the carrier stream or material, and those that seek only to convert the mercaptans into a less harmful derivative. Prominent among the solutions of the latter type is an oxidation process that involves the utilization of a phthalocyanine catalyst and an oxidizing agent in order to transform mercaptans into disulfides which are much more acceptable components.

In the utilization of this phthalocyanine process to oxidize mercaptans in organic streams—particularly organic streams boiling above the gasoline boiling range—we have noted that some difficulties are encountered in oxidizing the higher molecular weight mercaptans—as is shown in Example I. It is not that these higher molecular weight mercaptans cannot be oxidized by the pthalocyanine process; it is more a question of time. Specifically, we find that when an attempt is made to reduce the concentration of mercaptans in a sour organic stream to very low levels—less than 30 parts per million—via the phthalocyanine process, the amount of time required becomes prohibitive. The present invention obviates this problem by accelerating the oxidation reaction utilizing for this purpose a specifically designed reactive environment which comprises a phthalocyanine catalyst and an alkaline solution of an unusual polar organic solvent as will be hereinafter discussed.

Another problem that has been encountered in the utilization of this phthalocyanine process is one of initial catalyst activation. We have noted in our investigation of this problem that certain surface active materials, such as naphthenic acids and alkyl phenols, tend to adversely affect catalytic activity because, we believe, of their propensity to adhere to the surface of the phthalocyanine catalyst and there to act as a barrier to the approach of the reactant materials and in addition, their propensity to concentrate at the caustic-organic phase interface and there to interfere with the approach of the mercaptans from the organic phase to the phthalocyanine catalyst which is in the caustic phase. The present invention minimizes this effect by utilization of a special class of organic solvents which have the effect of attracting a substantial portion of these deactivating ingredients from the surface of the catalyst and from the caustic-organic phase boundary.

Still another problem encountered in the utilization of this phthalocyanine process is a long-range catalytic stability problem. This apparently involves the formation of a tar-like material on the surface of the catalyst. The exact nature of this material is not known at this time, but is believed to be a complex hydrocarbon product of surface active materials mentioned hereinbefore that, over a period of time, choke off access to the catalytic surface. Perhaps, the best evidence for its existence, as is pointed out in an example appended to this discussion, is that a slurry of phthalocyanine catalyst on a carbon support which initially is easily separable from a hydrocarbon phase that is being treated, tends after a period of time to be carried into the hydrocarbon phase as a colloidal dispersion that will no longer separate out. This fact coupled with the occasionally observed instability of the catalyst which is usually manifested by its frequent need for regeneration when treating high boiling hydrocarbon streams, we believe shows the formation of a catalytic deactivating material on the surface of the catalyst. The present invention minimizes this phenomenon, as shown hereinafter in the example, by the judicious choice of a polar organic solvent that retards the formation of this tar-like material and consequently, increases the stability of the phthalocyanine catalyst.

Therefore it is a principal object of the present invention to provide a mercaptan oxidation process which accelerates the oxidation of mercaptans, particularly high molecular weight mercaptans, by an oxidation agent in the presence of a phthalocyanine catalyst. A corollary objective is to increase the initial activity of a phthalocyanine catalyst in a process for the oxidation of high molecular weight mercaptans. Another ancillary objective is the stabilization of the phthalocyanine catalyst in a mercaptan oxidation process.

In a broad embodiment, the present invention involves a process for sweetening a sour organic stream containing a mercaptan component which comprises contacting, in a sweetening zone, said sour organic stream with an oxidizing agent, with a phthalocyanine catalyst and with an alkaline solution containing a polar organic solvent at oxidizing conditions selected to convert at least a portion of said mercaptan component into disulfides; said polar organic solvent being selected from the group consisting of dialkyl sulfoxide, amino-alcohols, amino-hydroxy-alkyl ethers, alkylamines, alkylpolyamines, alkylamides, and mixtures thereof.

Specific embodiments of this invention relate to particular preferred process conditions, concentration of reactants, compositions of catalytic material, and mechanisms of effecting the process. These will be hereinafter discussed in the detailed analysis of the elements and mechanisms that can be employed in the practice of the present invention, coupled with a detailed analysis of one particular embodiment of the present invention as illustrated in the attached drawing.

Without limiting the scope and spirit of the appended claims by this explanation, it appears that the difficulty encountered in oxidizing high molecular weight mercaptans is primarily caused by the inability of the caustic soluble or wetted catalyst to contact the oil-dissolved mercaptans. It seems that a mercaptan oxidation process using a caustic solution of a phthalocyanine catalyst is dependent in part for its efficacy on the existence of mercaptide ions in the alkaline phase of the reactive environment, and that this, in turn, implies that any agent which promotes the solubility of high molecular weight mercaptans in the alkaline phase will tend to increase the efficiency of the process. Associated with this idea is the more unobvious one that an agent that promotes solubility of the mercaptans in the alkaline phase may also have the property of attracting surface active materials, such as alkyl phenols and naphthenic acids, from the surface of the phthalocyanine material and thus increasing catalyst activity because these materials are believed to be the principal promoters of phthalocyanine catalyst deactivation by virtue of their ability to restrain the approach of the reactive ingredients. We have found, now, a group of organic materials with the desired properties and believe that the essential characteristic of these materials is their highly polar nature which tends to attract the slightly acidic mercaptans from the organic phase while at the same time attracting, and tending to keep off the surface of the catalyst, the surface active materials previously mentioned which are also slightly acidic (NB both phenols and naphthenic acids are polarized to some degree). These materials also have the unexpected property of retarding the formation of the tar-like material on the surface of the phthalocyanine catalyst which heretofore has been the principal long range deactivation mechanism. This latter effect is probably due to the ability of the highly polar organic solvents to prevent or retard the approach of surface active materials to the active sites of the catalyst, thus inhibiting the formation of the tar-like deposition which is believed to be a complex product of the surface active materials.

Before considering in detail the various ramifications of the present invention, it is convenient to define several of the terms and phrases used in the specification and in the appended claims. In those instances where temperatures are given to boiling ranges and boiling points, it is understood that they have reference to those which are obtained through use of Standard ASTM Distillation methods. The phrase gasoline boiling range as used herein refers to a temperature range having an upper limit of about 400° F. to about 425° F. The term middle distillate range is intended to refer to a temperature above the gasoline range but having an upper limit of about 650° F.—included here would be fractions that are called in the industry heavy naphthas, burner oils, fuel oils, diesel fuels, jet fuels, etc. The term kerosene would also be a special case of middle distillate range oil having an initial boiling point of about 300° F. to about 400° F., and an end boiling point of about 475° F. to about 550° F. The term "sweetening" as used herein denotes the process of treating a sour hydrocarbon fraction with an oxidizing agent at conditions designed to effect the oxidation of mercaptans to disulfides which are compounds of comparatively sweet odor. The term hydrocarbon fraction or distillate is intended to refer to a portion of a petroleum crude oil, of a mixture of hydrocarbons, of a coal tar distillate, etc., that boils within a given temperature range. The term "sour stream" is intended to encompass streams that range from those with low mercaptan content to those that are substantially pure mercaptan. The term "polar solvent" refers to a solvent in which the molecules are characterized by a slight separation of the center of density of the positive charges and of the negative charges which gives rise to an electrical dipole; as a result of this dipole, molecules which approach each other closely enough and with the proper orientation tend to adhere, the ends of unlike charges attracting each other. The term "surface active material" is used herein to refer to a material that consists of molecules that have a portion which is oil-soluble and a portion which is water-soluble. The "liquid hour space velocity" (LHSV) is defined to be the volume of the reference liquid flowing over the bed of catalyst per hour divided by the volume of the catalyst disposed within the reaction zone.

The input sour organic stream for the process of the present invention can be any sour organic stream in which mercaptan compounds are present, and it is desired to convert these compounds to disulfides. The novel process of the present invention is particularly applicable to the treatment of petroleum distillates such as: sour gasoline, including cracked gasoline, straight run gasoline, natural gasoline, or mixtures thereof; naphthas, jet fuels, kerosenes, aromatic solvents, stove oils, range oils, fuel oils, etc. Since the present invention is particularly applicable to input streams that contain significant amounts of high molecular weight mercaptans, the input stream will frequently be a middle distillate range oil such as a kerosene, jet fuel, stove oil, range oil, burner oil, gas oil, fuel oil, etc.

The present invention may be more clearly understood by reference to the accompanying drawing which illustrates one particular embodiment thereof. It is not intended, however, that the process of the present invention be unduly limited to the embodiment illustrated. In the drawing, various flow valves, control valves, coolers, pumps, compressors, etc., have either been eliminated or greatly reduced in number as not being essential to the complete understanding of the present process. The utilization of such miscellaneous items will immediately be recognized by one possessing the requisite skill within the art of petroleum processing techniques.

Referring now to the drawing, the sour organic stream enters the process through line 1, an oxidation agent is introduced through line 2, and a polar-organic alkaline solution is recycled by way of line 8. The mixture is passed by way of line 2 into treatment zone 3 which contains a phthalocyanine catalyst. When desired, the sour organic stream, the oxidizing agent, and the alkaline solution containing a polar organic solvent can be introduced separately to treatment zone 3. In still another embodiment not illustrated in the drawing, downward flow instead of upward flow may be utilized in treatment zone 3.

The phthalocyanine catalyst may be present within treatment zone 3 as a fixed bed of a catalytic composite on a suitable carrier material; a slurry of the phthalocyanine catalyst may also be maintained within zone 3; and another possibility is that the phthalocyanine catalyst may be dissolved or suspended in the alkaline solution and contacted with the sour organic stream and oxidizing agent in a liquid phase operation.

An suitable phthalocyanine catalyst is used in the present invention and preferably comprises a metal phthalocyanine. Particularly preferred metal phthalocyanines comprise cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine in general is not highly polar and, therefore, for improved operation is preferably utilized as a polar derivative thereof. A preferred polar derivative is the sulfonated derivative. Thus, a particularly preferred phthalocyanine catalyst comprises cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In the case illustrated in the drawing, treating of the sour organic stream is effected in the presence of an alkaline reagent. Any appropriate alkaline reagent may be employed. A preferred reagent comprises an aqueous solution of an alkali metal hydroxide such as sodium hydroxide solution, potassium hydroxide solution, etc. Other alkaline solutions include aqueous solutions of lithium hydroxide, cesium hydroxide, etc., although in general, these hydroxides are more expensive and therefore are not preferred for commercial use. A particularly preferred alkaline solution is an aqueous solution of from 1 to about 50% by weight concentration of sodium hydroxide, and more preferably the sodium hydroxide concentration is within the range of about 4% to about 25% by weight concentration.

As hereinbefore set forth the alkaline solution used in treatment zone 3 contains substantial amounts of a polar-organic solvent. Not every polar-organic solvent can be used in the process of the present invention; for instance, a well-known polar-organic solvent is methanol, and we have found that methanolic solutions not only do not improve the oxidation of higher molecular weight mercaptans but, in high enough concentrations, actually retard the oxidation of mercaptans. Therefore, the polar-organic solvent that is admixed with the alkaline solution is selected from the group consisting of dialkyl sulfoxides, amino alcohols, aminohydroxyalkyl ethers, alkylamines, alkylpolyamines, alkylamides, and mixtures thereof. Typical sulfoxides are: dimethyl sulfoxide, diethyl sulfoxide, dipropyl sulfoxide, dibutyl sulfoxide, etc. Typical amino alcohols are: 2-amino-ethanol, 3-amino-1-propanol, 3-amino - 2 - propanol, 4-amino-1-butanol, 4-amino-2-butanol, 2-amino-2'-hydroxydiethylamine, 3-amino-3'-hydroxydipropylamine, 2,2'-dihydroxydiethylamine, 3,3'-dihydroxydipropylamine, etc. Typical amino-hydroxy-alkyl ethers are: 2-(2-aminoethoxy)-ethanol, 3-(3-aminopropoxy)-propanol, 4-(4-aminobutoxy)-butanol, etc. Suitable alkylamines are: ethylamine, n-propylamine, i-propylamine, n-butylamine, i-butylamine, s-butylamine, N-methylethylamine, diethylamine, N-propylethylamine, N-methylpropylamine, N - ethylpropylamine, dipropylamine, etc. Typical alkylpolyamines for use in the present invention are: 1,2-diaminoethane, 1,3-diaminopropane, 1,4-diaminobutane, 1,5-diaminopentane, N,N'-dimethyl-1,2-diaminoethane, N,N' - diethyl-1,2-diaminoethane, 2,2'-diaminodiethylamine, 3,3'-diaminodipropylamine, etc. Typical alkylamines are: formamide, dimethyl formamide, acetamide, N,N-dimethylacetamide, propionamide, etc. A particularly preferred polar organic solvent is dimethylsulfoxide. It is understood that the different polar organic solvents are not necessarily equivalent, but all of them will serve to accelerate the oxidation of mercaptans and improve the catalytic activity and stability of the phthalocyanine catalyst.

The polar organic solvent is present within the alkaline solution in concentrations which may range from 1.0% to 90% by volume of the alkaline solution and more preferably from 5.0% to 50.0% by volume of the alkaline solution.

As hereinbefore set forth, the phthalocyanine catalyst is in one embodiment composited with a suitable carrier and utilized as a fixed bed or as a slurry in treating zone 3. The carrier should be insoluble or substantially uneffected by the caustic solution and hydrocarbons under the conditions prevailing in the treatment zone. Activated charcoals are particularly preferred because of its high adsorptivity and stability under these conditions. Other carbon carriers include coke, charcoal, which may be obtained from any suitable source including bone char, wood carcoal, charcoal made from coconuts. Other carriers include: silica as for example, sand, glass beads, etc., clays, and silicates including those synthetically prepared and naturally occurring; alumina; magnesia; etc.; or mixtures thereof.

The composite of phthalocyanine and carrier may be prepared in any suitable manner. In one method, the carrier may be formed in the particles of uniform or irregular size and shape, including spheres, pills, pellets, etc. And the carrier is intimately contacted with a solution of phthalocyanine catalyst. Aqueous, alcoholic, or alkaline solutions of the phthalocyanine catalyst is prepared and, in a preferred embodiment, the carrier particles are soaked, dipped, suspended, or immersed in the solution. In another method the solution may be sprayed onto, poured over or otherwise contacted with the carrier. Excess solution may be removed in any suitable manner and the carrier containing the catalyst is allowed to dry to room temperature, or is dried in an oven or by means of hot gasses passed thereover, or in any other suitable manner.

In general it is preferred to composite as much catalyst with the carrier as will form a stable composite, although a lesser amount may be so deposited if desired. In one preparation, 1% by weight of cobalt phthalocyanine sulfonate catalyst was composited with activated carbon by soaking granules of the carbon in the solution of phthalocyanine catalyst. In another method the catalyst support may be deposited in a treating zone and the phthalocyanine catalyst solution passed therethrough in order to form the catalyst composite in situ. If desired, the solution may be recycled one or more times in order to prepare the desired composite. In still another embodiment, the carrier may be deposited in the treating chamber and the chamber filled with the solution of the catalyst thereby forming the composite in situ.

When the phthalocyanine catalyst is present in treatment zone 3 as a fixed bed or as a slurry on a carbon support the concentration of phthalocyanine catalyst may range from .1% to about 10.0% by weight of the catalytic composite and preferably about 1.0% by weight of the catalytic composite. When the catalyst is present in the form of a solution of the catalyst in the polar-organic alkaline solution the phthalocyanine catalyst is used in a range of from 5 to 1000 and preferably from about 10 to 500 p.p.m. by weight of polar-organic alkaline solution.

The oxidizing agent that enters treatment zone 3 via line 2 is preferably air, but it is to be understood that any other suitable oxidizing agent may be employed, including oxygen or other oxygen containing gases. In some cases a solid hydrocarbon distillate may contain entrained oxygen or air in sufficient concentrations to accomplish the desired treating, but generally it is preferred to introduce air into the treating zone. The amount of air must be sufficient to effect oxidation of the mercaptans, although an excess thereto is generally not objectionable. Therefore, the amount of air that will be injected into treatment zone 3 in the preferred embodiment will range from about 10% of the volume of the sour organic stream entering through line 1 to about 200% of the sour organic stream and preferably from about 75% to about 125% by volume of said sour organic stream.

Treatment of the sour organic stream in zone 3 is generally effected at ambient temperatures, although elevated temperatures may be used and generally will not exceed about 300° F. or more. Atmospheric pressure is employed, although superatmospheric pressure up to about 1000 pounds per square inch or more may be employed if desired. The time of contact in the treatment zone will be set to give the desired reduction in mercaptan content and may range from about 1 minute to about two hours or more, depending upon the size of the treatment zone, the amount of catalyst therein and the particular hydrocarbon distillate being treated.

The effluent from treatment zone 3 is withdrawn through line 4 and passed into separating zone 5. Excess air is removed from separating zone 5 via line 6. In separating zone 5 a phase separation takes place and the treated hydrocarbon distillate is withdrawn via line 7 and is recovered as the desired product of the process. The alkaline solution containing any entrained catalyst is withdrawn from zone 5 through line 8, and preferably at least a portion thereof is recycled by way of line 8 into treatment zone 3 for further use therein. Fresh alkaline solution may be added to the process via line 9. Also additional phthalocyanine catalyst may be introduced into the process via line 9. In addition polar organic solvent may be added periodically, if needed, to the process via line 10.

In another batch-type embodiment not illustrated in the drawing, the sour organic stream, the phthalocyanine catalyst and the alkaline solution containing the polar organic solvent are placed in the reaction zone, and air is bubbled therethrough until the desired oxidation is completed.

In still another embodiment, the phthalocyanine catalyst is present within the treatment zone as a fixed bed on an appropriate support, and the alkaline solution containing a polar organic solvent is charged intermittently such that the amount of the polar-organic solution entrapped in the bed fluctuates within a desired range. This intermittent process is preferentially accomplished first, by charging the polar-organic alkaline solution, either in admixture with the sour organic stream or not, to the bed until such time as the bed becomes saturated with the solution; second, by terminating the flow of the polar-organic alkaline solution and charging only the sour organic stream and air; and finally, by repeating the polar-organic alkaline solution introduction at an interval of time that is determined by the residual alkalinity of the bed of catalytic support as measured by the mercaptan concentration of the organic effluent from the treatment zone.

It is to be kept in mind that the exact selection of the particular variables of this process are at least partially dependent upon the physical and/or chemical characteristics of the sour organic stream being subjected to the present process and as such have to be individually determined for each particular type of input stream.

The following examples are given to illustrate further the process of the present invention, and indicate the benefits to be afforded by the utilization thereof. It is understood that the examples are given for the sole purpose of illustration and are not considered to limit the generally broad scope and spirit of the appended claims.

EXAMPLE I

A commercial kerosene having a mercaptan sulfur content of 493 p.p.m. was treated in a stirred container with air and an equal volume of 20% by weight sodium hydroxide solution containing 100 p.p.m. of cobalt phthalocyanine disulfonate catalyst. At the end of three minutes, the residual mercaptan content in the kerosene was measured and found to be 60 parts per million.

Another batch of the same kerosene was then treated in a stirred container with air and an equal volume of a solution composed of 10% by volume of 20% by weight sodium hydroxide solution and 90% by volume of dimethyl sulfoxide. Again the treated kerosene was separately recovered after 3 minutes and found to contain 16 p.p.m. of residual mercaptans.

Still another batch of this commercial kerosene was treated in a stirred container with air and an equal volume of a solution composed 10% by volume of 20% by weight sodium hydroxide solution and 90% by volume dimethyl formamide. Once again the treated kerosene was separately recovered after 3 minutes and found to contain 14 p.p.m. of residual mercaptan.

From this data, it can be seen that the treatment of the kerosene with air in the presence of a phthalocyanine catalyst and a highly polar-organic solvent results in a singular improvement in the efficiency of the process. This is even more remarkable when considered in the light of the fact that it has been determined, via steady state kinetic studies, that the mercaptan oxidation reaction is initially very rapid, followed by a slow first order reaction for mercaptan sulfur concentration of less than 75 p.p.m. Since the usual problem area is in the latter area (i.e., less than 75 p.p.m.) and since it has been determined (at least for a solid bed of phthalocyanine catalyst on 30 mesh Nuchar WA) that a plot of the log of mercaptan concentration for kerosene versus residence time (reciprocal space velocity) is linear in this area, the present invention greatly decreases the contact time that would be necessary to effect the same reduction in mercaptan concentration in a simple solution of phthalocyanine catalyst and caustic. It is particularly noteworthy when it is realized that an improvement of a factor of 2 in decrease of mercaptan concentration for the phthalocyanine catalyst/caustic process would normally require a greatly increased residence time because of the observed log plot for mercaptan concentration versus time for kerosene. Thus, the present invention shows a significant improvement in the mercaptan oxidation process in the area where greatest difficulty has been experienced—namely, very low concentrations of high boiling mercaptans.

EXAMPLE II

A commercial kerosene having an initial boiling point of about 350° F., and end boiling point of about 550° F., and containing about 500 p.p.m. of mercaptan sulfur, is treated in a treatment zone similar to that shown in the attached drawing. The charge to treatment zone 3, entering the zone from line 2 via line 8, consists of: a solution of 33.3% by volume of dimethyl sulfoxide (DMSO), 50% by volume of 20% by weight sodium hydroxide, and 16.7% water in which 25 milligrams of phthalocyanine disulfonate have been dissolved (yielding 75 p.p.m. of catalyst based on total caustic/DMSO solution) an equal volume of the kerosene entering the zone thru line 2 via line 1; and an equal volume of air entering via line 2. Treatment zone 3 is maintained at a temperature of 70° F. and the pressure is atmospheric.

The effluent from zone 3 is passed to separating zone 5. The treated kerosene decanted via line 7 is found to contain less than 20 p.p.m. of mercaptan sulfur. The caustic phase is recycled via line 8 and line 2 to zone 3.

The operation of the process under these conditions is found to be quite stable and no significant loss of catalyst is experienced.

EXAMPLE III

This example demonstrates that the present invention will yield excellent results with a solution of the phthalocyanine catalyst in a continuous operation.

This example involves the same flow scheme, and charge stock as in Example II.

The catalyst that is present within treatment zone 3 is a fixed bed of cobalt phthalocyanine monosulfonate (CPM) on a charcoal support. It is prepared by the addition of 1 gram of the CPM in methanol for each 99 grams of carbon support (which is a commercial product marketed under trade name of "Nuchar type WA" and is supplied in granules of 30 to 40 mesh). The mixture is then stirred for 15 minutes and is allowed to stand until all color is absorbed on the carbon. The catalyst is then filtered out and is dried to constant weight at 120° C. This procedure results in a catalytic composite containing 1% by weight of CPM.

The recycle caustic solution entering treatment zone 3 via line 2 and line 8 consists of 16% by volume dimethyl sulfoxide and 84.0% by volume of an 8% by weight solution of sodium hydroxide.

The hydrocarbon charge entering treatment zone 3 is flowing at 0.1 liquidly hourly space velocity (LHSV). The recycle caustic stream is also pumped at 0.1 LHSV. Air enters the system at a rate corresponding to four times the stoichiometric amount needed. Treatment zone 3 is maintained at a temperature of 140° F. and a pressure of 100 p.s.i.g.

The effluent from the treatment zone is passed via line 4 to separating zone 5. The kerosene decanted off via line 7 is found to contain less than 30 p.p.m. of mercaptan sulfur.

The operation is found to be quite stable with no observed loss of catalyst activity due to formation of a tar-like material on the catalyst.

EXAMPLE IV

Once again the charge stock is the same in this example as in Example II.

The catalyst used in this example is cobalt phthalocyanine monosulfonate (CPM) deposited on a very fine mesh carbon to yield a catalytic slurry. It is prepared by the addition of 1 gram of CPM in methanol for each 99 grams of carbon support (which is a commercial product marketed under the trade name of "Nuchar type KD" and is supplied in granules of 60–100 mesh size). The mixture is then stirred for 15 minutes and is allowed to stand until all color is absorbed on the carbon. After filtering the carbon is dried to constant weight at 120° C. This results in a catalytic composite that contains 1% by weight of CPM.

In this example the flow scheme shown in the attached figure is slightly modified in that the process is operated with a slurry of catalyst and a caustic solution (composed of 16.0% by volume of dimethyl sulfoxide and 84% by volume of 8% by weight solution of sodium hydroxide) maintained in zone 3. The sour organic stream and an equal volume of air are introduced via line 2 at such rates that twice the amount, by volume of the caustic solution of catalyst, flow thru the zone per hour (e.g., for a very small scale reactor the proportion would be as follows: (1) alkaline solution would be 10 grams of catalytic composite and 125 cc. of 8% sodium hydroxide and 25 cc. of dimethyl sulfoxide, (2) charge rate would be 300 cc. per hour, and (3) air rate would be 300 cc. per hour (at standard conditions)).

The phase separation is maintained within zone 3 and the input charge stock and air are introduced at a point substantially below the phase boundary. In order to insure adequate contact, treatment zone 3 is also provided with an agitation mechanism. Treatment zone 3 is maintained at 70° F. and at atmospheric pressure.

A substantially treated organic stream is withdrawn as effluent from the upper portion of zone 3 and passed via line 4 to separating zone 5 where any entrained caustic solution or catalyst is allowed to settle out. A product stream is withdrawn from the separating zone via line 7 and is found to contain about 10 p.p.m. of mercaptan sulfur. The slight amount of catalyst and caustic that is carried over is recycled via line 8 to treatment zone 2.

The plant is operated in the above fashion for a period of 10 days and no significant loss of catalyst is noted. Nor is there any appreciable catalytic deactivation observed.

In the past, a slurry process operated in the above manner has been plagued by a severe loss of catalyst from the reactor. It is believed that this was caused by tar-like deposition on the catalyst which enabled it to form a colloidal dispersion in the kerosene which was essentially non-separable within the confines of the process; and therefore, the catalyst was carried out of the reactor in the treated organic stream. The present invention prevents the suspension of carbon in the hydrocarbon effluent and thus makes the slurry process economically feasible.

We claim as our invention:

1. A process for sweetening a sour hydrocarbon fraction boiling above the gasoline range and containing naphthenic acids, alkyl phenols and a high molecular weight mercaptan component, which comprises contacting said hydrocarbon fraction with an oxidizing agent and a solid phthalocyanine catalyst in the presence of an alkali metal hydroxide solution containing a polar organic solvent at oxidizing conditions selected to convert at least a portion of said mercaptan component into disulfide; said polar organic solvent being selected from the group consisting of dialkyl sulfoxides, amino alcohols, amino-hydroxy-alkyl ethers, alkyl amines, alkyl polyamides, alkyl amides, and mixtures thereof.

2. The process of claim 1 further characterized in that said hydrocarbon fraction is a kerosene stream.

3. The process of claim 1 further characterized in that said phthalocyanine catalyst is selected from the group consisting of cobalt phthalocyanine sulfonates and vanadium phthalocyanine sulfonates.

4. The process of claim 1 further characterized in that said phthalocyanine catalyst is supported on a refractory material and the supported catalyst is maintained as a fixed bed during said contacting step.

5. The process of claim 1 further characterized in that said phthalocyanine catalyst is supported on a refractory material and the supported catalyst is maintained as a slurry during said contacting step.

6. The process of claim 1 further characterized in that said polar organic solvent is dimethyl sulfoxide.

7. The process of claim 1 further characterized in that said polar organic solvent is dimethylformamide.

8. The process of claim 1 further characterized in that said polar organic solvent is 2-aminoethanol.

9. The process of claim 1 further characterized in that said polar organic solvent constitutes about 5% by volume to about 50% by volume of said alkali metal hydroxide solution containing a polar organic solvent.

References Cited

UNITED STATES PATENTS

| | | | |
|---|---|---|---|
| 3,052,626 | 9/1962 | Ferrara | 208—204 |
| 3,205,164 | 9/1965 | Brown | 208—207 |
| 3,213,155 | 10/1965 | Schriesheim et al. | 208—204 |

FOREIGN PATENTS

| | | |
|---|---|---|
| 618,200 | 4/1961 | Canada. |
| 849,998 | 9/1960 | Great Britain. |

DELBERT E. GANTZ, *Primary Examiner.*

G. J. CRASANAKIS, *Assistant Examiner.*